Feb. 17, 1959 W. G. REICHERT, JR 2,874,315

SWITCHING DEVICE

Filed June 26, 1958 3 Sheets-Sheet 1

INVENTOR.
WILLIAM G. REICHERT JR.

Feb. 17, 1959

W. G. REICHERT, JR

SWITCHING DEVICE 2,874,315

Filed June 26, 1958

3 Sheets-Sheet 2

INVENTOR.
WILLIAM G. REICHERT, JR.

INVENTOR.
WILLIAM G. REICHERT JR.

2,874,315

SWITCHING DEVICE

William G. Reichert, Jr., Cedar Grove, N. J., assignor to Allen B. Du Mont Laboratories, Inc., Clifton, N. J., a corporation of Delaware Application June 26, 1958, Serial No. 744,810

11 Claims. (Cl. 307—106)

This invention relates to switching devices and particularly to a novel circuit for reducing power requirements while providing rapid switching of pulse circuits.

Present switching circuits such as multivibrators normally utilize a pair of stages, either vacuum tube or transistor, connected regeneratively to produce a controlled oscillation in the form of rectangular pulses. The pulse waveform is made up of steep vertical transition portions and longer semistable or steady state level portions. The output may be either continuous and self-sustaining or require external triggering, with each stage of the multivibrator conducting alternately for a portion of the cycle, while the other stage is cut off. Ideally, the switching or transition portion should be instantaneous. However, the speed of response during these short switching intervals is limited by the charge and discharge time of the various coupling and stray capacities of the circuit.

To provide for the rapid charging of the capacities a comparatively large flow of current should be made available at the appropriate time. The charging current path should therefore include relatively small load resistors which do not unduly restrict the flow or increase charging time. However, since there is always one multivibrator stage conducting, these small resistances also permit the circuit to drain unnecessarily large currents from the power supply during semistable periods. Thus, a large circuit current flows throughout the cycle, with the total drain remaining substantially constant, although the proportion through each stage may vary at a particular instant. Since large currents are necessary only for the short switching times, it would be preferable for efficient operation to use large load resistances to limit conduction during steady state periods. Nevertheless, the normal configuration continually passes a heavy flow of current to provide rapid switching and therefore results in unnecessary heating of components, inefficiency, and requires the use of large power sources.

It is therefore the principal object of the instant invention to provide a novel pulse generator circuit.

It is another object to provide a multivibrator type circuit having improved switching response.

A further object is to provide a multivibrator type circuit having greater efficiency and smaller average current requirements.

In the preferred embodiment of the instant invention, an additional pair of transistors is added to the pair normally used in a multivibrator circuit, together with larger load resistance than previously employed. One of these added transistors and a series diode are placed in a substantially parallel arrangement with each of the relatively large load resistors in the collector circuit of both stages. The added transistors are made conductive to provide a low resistance shunt path, which effectively bypasses the load resistor during appropriate periods. Higher currents are thus made available for rapidly charging capacitors of the circuit for the short switching intervals, while for the remainder of the cycle in which only small currents are required, the large load resistor is permitted to limit the current. In this manner, average current and power requirements are reduced while permitting the attainment of rapid response times.

The detailed description and accompanying drawings which follow consider the switching device in several particular configurations. It is to be understood that these embodiments are chosen for purposes of explanation and illustration and are not to be construed as defining the limits of the invention.

Multivibrator circuits which utilize vacuum tubes are well known and their operation can be found in such standard texts as "Time Bases" by O. S. Puckle, 1951 edition, or "Waveforms," vol. 19 of the M. I. T. Radiation Laboratories Series, first edition, 1949. The transistorized counterparts of these various circuits have been described in such texts as the "Handbook of Semi-Conductor Electronics" by L. P. Hunter, 1956 edition, and "Transistors Handbook" by W. D. Bevitt, 1956 edition. The improved operation made available by the instant invention may be obtained with many types of multivibrator and switching circuit configurations, as will be shown in the following descriptions of the several embodiments.

Figure 1:
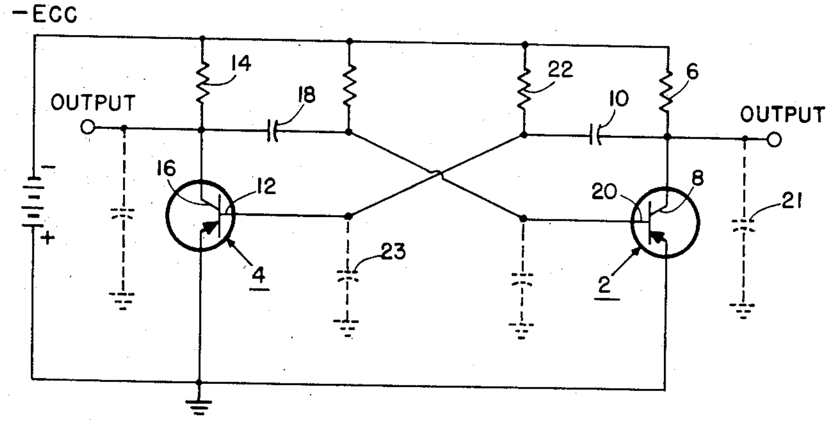
Fig. 1 (PRIOR ART)
Fig. 1 shows a typical prior art astable or free running transistor multivibrator circuit using a common emitter configuration.

Fig. 1 is an example of the prior art free running or astable type transistor multivibrator configuration. The circuit as shown incorporates PNP polarity type transistors which utilize a positive potential at the reference ground and a negative potential at the direct voltage supply terminal. These voltages are the reverse of those usually found in vacuum tube circuits. NPN type transistors having normal polarity characteristics, similar to that used with tubes, may also be employed. All polarities in the latter case would be opposite to those indicated in Fig. 1. In the instant case, a positive voltage or decrease in negative voltage on the base electrode with respect to the emitter, can cut off conduction, while the opposite polarity is effective with the NPN transistors. The transistors in this circuit are connected in the common emitter configuration, wherein the input is fed into the base electrode and output of a reversed polarity is taken from the collector electrode, with the emitter electrode being grounded or at a common reference point.

Although the circuit is apparently symmetrical, components cannot be perfectly matched so that an inherent unbalanced condition exists which causes the circuit to function initially upon application of supply voltage. After several irregular output pulses a repetitive cycle commences, of which the following is a typical sequence of operation. In the first instance of time, it is assumed that the circuit is in a state of transition with current through a first signal switching transistor 2 increasing while current in a second signal switching transistor 4 is decreasing. The terms "increasing" and "decreasing" as used in the following discussion, refer to pulse magnitude changes, while the terms "positive" or "negative" going refer to the direction of the change.

The voltage across series collector load resistor 6 thus increases with current, causing the negative voltage at output collector 8 to decrease with respect to a reference ground. This decreasing negative collector voltage or positive going pulse is coupled through a capacitor 10 to input base 12 of transistor 4, causing the second stage to reduce conduction. The voltage across load resistor 14 then decreases, while output voltage at the collector 16 increases toward the value of the negative E*cc* supply. The increase is transferred through a capacitor 18 to input base 20 of transistor 2, causing a further increase of current through the first stage. In this manner, a regenerative or cumulative switching action builds up almost instantaneously, until a maximum current or condition of saturation results in transistor 2, while transistor 4 completely cuts off. This condition occurs at the end of the transition period and will be more fully discussed hereinafter. As a result, voltage at output collector 8 reduces sharply toward ground or zero at the same time that a steep voltage rise occurs at collector 16 of transistor 4. The main current flow is now directed through transistor 2 and load resistor 6, which limits conduction. During the transition period, collector to ground stray capacity 21, which is assumed to have been charged through load resistor 6 during a previous portion of the cycle, discharges through the low resistance path of conducting transistor 2.

Following the transition period the respective transistors reach their maximum and minimum limits and the collector voltages level off in a semistable state. Transistor 2 is in a saturated condition, with collector 8 having a low voltage and high current, while transistor 4 is cut off, with collector 16 having a maximum voltage and negligible current. The peak output voltage swing now available is limited substantially to the magnitude of the direct voltage supply. Thus, the collectors may swing from approximately zero volts or a ground reference level at saturation, to the supply voltage level at cut off, and then back again. The supply voltage that can be employed is in turn limited by transistor and circuit characteristics.

The previously mentioned condition of saturation which occurs, results from the transistor being permitted to operate in the saturated or maximum current region of its characteristic curve. This takes place at the peaks of the pulse waveform. The current path in the normal unsaturated circuit is between emitter and collector, with an additional small flow between emitter and base electrodes. A slight potential difference appears between the latter two electrodes, with a larger potential being at the collector. Saturation, however, causes increased base and collector currents to flow and results in all the electrodes operating at close to the same potentials, with a sharp reduction of transistor resistance. In addition, under certain bias conditions, as will be shown later, saturation may cause a reverse current to flow between the collector and base electrodes, while the emitter to base current may be cut off.

During the succeeding semistable or level interval, coupling capacitor 10 starts to discharge and leak off by way of transistor 2 and resistor 22, through the voltage source and back to ground. The capacitor is assumed to have been charged during the previous half cycle through a path from ground, through transistor 4 and load resistor 6 to the E*cc* supply. Similarly, the stray and input capacities 23, in the base circuit of transistor 4, which were previously charged from ground to the E*cc* supply through capacitor 10 and load resistor 6, now discharge through resistor 22. When capacitors 10 and 23 discharge sufficiently, voltage at base 12 again permits current to flow through transistor 4, and a second transition period or reverse switching action begins. The voltages at output collector 16 and base 20 then become smaller, cutting off conduction through transistor 2 and causing stray capacities 21 and 23 and capacitor 10 to charge through the previously mentioned paths including load resistor 6. Accordingly, voltages at collector 8 of transistor 2 and base 12 of transistor 4 increase, causing further conduction through transistor 4 which then saturates. The action of the capacitors in the collector circuit of transistor 4 and base of transistor 2 is now the same as that described for the other section during the first half cycle and thereafter the sequence of operation continues to repeat, resulting in a series of rectangular output pulses.

Figure 2:
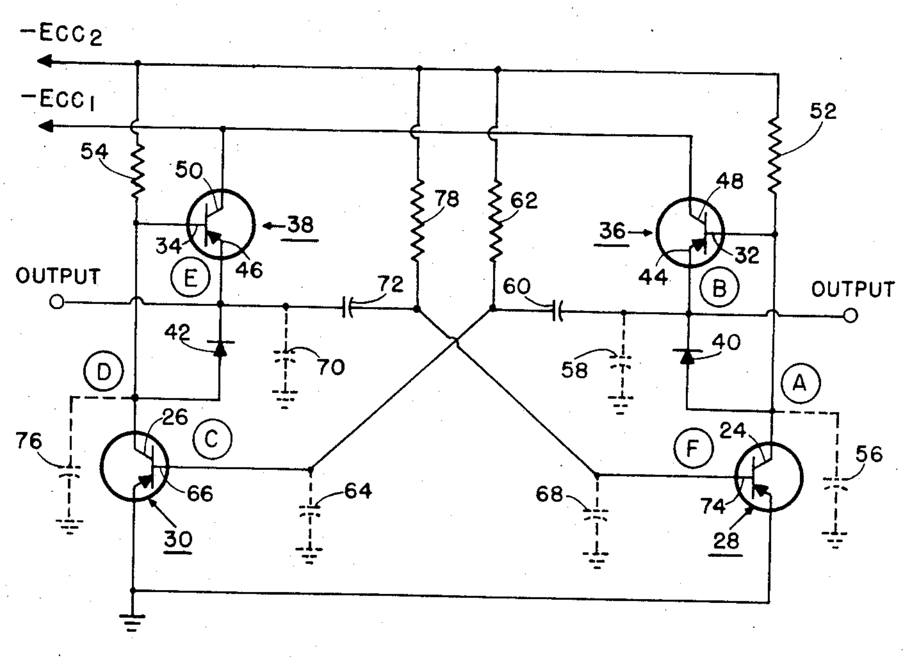
Fig. 2 illustrates the instant invention as utilized in an astable multivibrator circuit such as that of Fig. 1.

When either stage conducts, collector to ground stray capacities thereof are permitted to discharge quickly through the small forward resistance of the conductive transistor. However, when cutoff occurs, these capacities and others are charged through the particular collector load resistor. As heretofore mentioned, to obtain a correspondingly rapid charge time, the collector load should be small. As a result, when the load is a simple fixed resistor, rapid transition generally requires use of large charging currents. Since one of the two stages always conducts, a heavy resultant circuit current continues to flow during semistable or steady state periods, when only small currents are desirable. This undesirable condition is overcome in the instant invention by effectively shunting the collector load resistor of each signal switching transistor shown in Fig. 1 with a second load switching transistor and a diode, as shown in Fig. 2, during appropriate periods. With the exception of the aforementioned new components, a larger value load resistor and an additional direct voltage source, the remainder of the new circuit is essentially the same as that of Fig. 1. The newly added transistors are connected in a common collector or emitter follower configuration in which the input is fed into the base electrode and output of the same polarity is taken from the emitter electrode, while the collector electrode is at a common reference level. This type of connection inherently presents a low output impedance.

In the new arrangement of Fig. 2, collectors 24 and 26 of signal switching transistors 28 and 30 respectively, are connected to the bases 32 and 34 of added load switching transistors 36 and 38, and also to diodes 40 and 42 which are in series with emitters 44 and 46 of the added transistors. The output pulses of the circuit are now taken at these emitter terminals. The collectors 48 and 50 of transistors 36 and 38 connect to a negative supply voltage $Ecc_1$, similar to E*cc* of Fig. 1, while load resistors 52 and 54 are connected to a more negative direct voltage supply $Ecc_2$. The two voltage levels may be obtained by well known methods, such as tapped batteries or voltage divider networks. The new load circuit in effect provides a low resistance shunt path and high currents which speed response time during transition periods while utilizing a larger load resistor to limit current in the steady state intervals.

Figure 3:
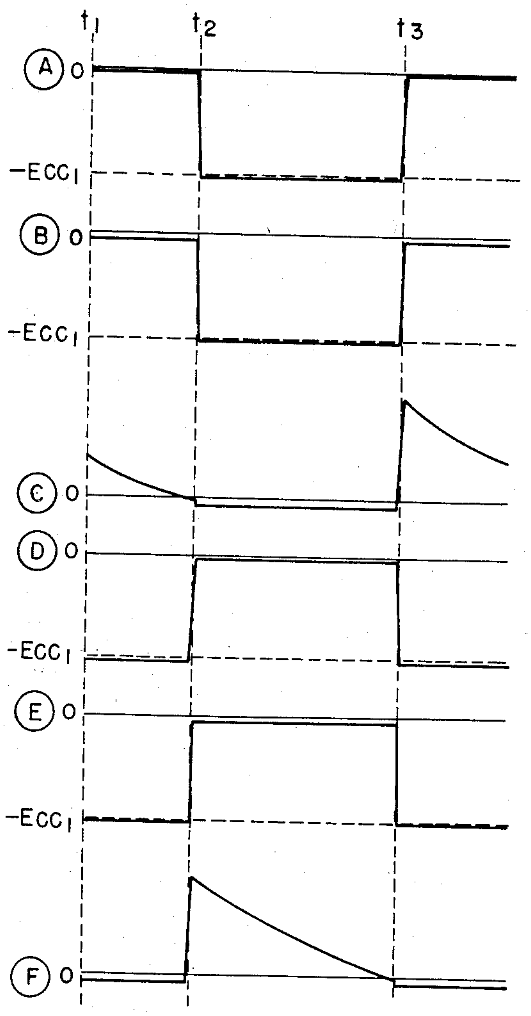
Fig. 3 depicts the pulse waveforms at various points and the sequence of operation of the circuit of Fig. 2.

The action and sequence of operation of the improved astable multivibrator circuit of Fig. 2 may best be shown with reference to the pulse waveforms of Fig. 3. The letters represent various portions of the circuit at which the pulses occur. In the first instance, at time $t_1$ of waveform A, it is assumed that signal switching transistor 28 is saturated in the "on" or semistable conduction state, with collector 24 being at close to ground or zero potential. Conduction of transistor 28, which started during the transition period prior to $t_1$, provides a path for rapid discharge of stray capacities 56 and 58 through the small transistor forward resistance. The discharge path for capacity 58 also includes diode 40. The capacities are assumed to have been charged during the previous half cycle.

At the same time coupling capacitor 60, which was also charged during the prior half cycle, is discharging toward the value of the $Ecc_2$ supply through the path including transistor 28, diode 40, and resistor 62, while stray capacity 64 similarly discharges through resistor 62. The small discharge current of capacitor 60 flowing through diode 40, causes a voltage drop which makes output voltage at emitter 44, waveform B, slightly negative with respect to base 32, waveform A, and keeps load switching transistor 36 cut off. With base current of transistor 24 being quite small, conduction in this portion of the circuit during the semistable period is thus substantially limited to that through collector 24 and load resistor 52.

As shown by waveform C, capacitor 60 causes a positive potential to appear at base 66 of signal switching transistor 30. Since the base is positive with respect to ground, transistor 30 is temporarily "off," or not conducting. As capacitor 60 continues to discharge, base 66 gradually approaches a negative value.

Load switching transistor 38 is presently assumed to be conducting in a saturated condition, with reverse current flowing from $Ecc_1$ and collector 50, through base 34 and load resistor 54 to the more negative $Ecc_2$ supply. This type of saturated action, which was referred to previously, results from the unusual circuit configuration and the use of two differently valued direct voltage sources. The normal saturation of the lower transistor stages occurs with ground as the common voltage reference level, while in this instance the saturation level of the upper stages is that of the $Ecc_1$ supply. As shown by Fig. 3, waveform B, the output pulses at the emitter of the upper stage also alternate between the zero level and the $Ecc_1$ level. However, the zero level occurs upon saturation of the lower stage, while the $Ecc_1$ level is reached at the time the upper stage saturates.

The voltage at the connection between collector 26 and base 34, waveform D, is now held or clamped to approximately the value of $Ecc_1$, with the difference between the two voltage sources appearing across load resistor 54. Current in this portion of the circuit during the semistable period is thus limited, as before, by the load resistance. Due to the saturated condition of transistor 38 during this interval, voltages at lower collector 26 and base 34, and that at emitter 46, waveform E, are all close to the same value with base 34 being slightly negative with respect to emitter 46. As a result, a diode 42 and also emitter 46 are cut off. At the same time stray capacities 68 and 70 and coupling capacitor 72 are in a charged state from the preceding transition period and hold base 74 of transistor 28 negative, as in waveform F, to maintain conduction through the latter stage. Stray collector capacity 76 of transistor 30 is similarly in a charged state at present.

At time $t_2$, coupling capacitor 60 and stray capacity 64 which continued to discharge toward $Ecc_2$, cause base 66 to reach a slightly negative value, waveform C, resulting in conduction through transistor 30. Temporarily, voltage at base 34 of transistor 38 remains clamped to the $Ecc_1$ value, causing current through load resistor 54 to be constant. Therefore, as current through transistor 30 increases, reverse current of transistor 38 decreases, until a point is reached at which the lower stage conducts more current through resistor 54 than the previous maximum reverse current of the upper stage. At that moment, transistor 38 comes out of saturation, permitting collector 26 and base 34 to become less negative and approach ground potential, as in waveform D. During this time, the negative charge on stray capacity 76 discharges rapidly through conducting transistor 30 and the negative voltage at base 34 decreases with respect to that at emitter 46. The latter electrode potential lags the base due to the charge on capacities in the emitter circuit. Diode 42 which had been cut off, now conducts slightly, resulting in a positive to negative voltage drop which cuts off transistor 38. Stray capacity 70 then discharges quickly through conducting transistor 30 and diode 42. Voltage at collector 26 continues to decrease rapidly toward zero until the "on" or saturation level of transistor 30 is reached. As in the case of the portion of the circuit first described, base current is again small and the main current flow in the "on" state is once more substantially limited to that through the lower collector and the load resistor. Thereafter, a continued small voltage drop, caused by a slight discharge current of coupling capacitor 72 through diode 42, maintains transistor 38 at cutoff during the subsequent semistable period. Since diode 42 is conducting, voltage at output emitter 46, waveform E, closely follows waveform D at lower collector 26 and upper base 34.

The steep positive going transition pulse at emitter 46 is transferred instantaneously through capacitor 72 to base 74 of transistor 28, waveform F, where it cuts off current flow. The collector 24 of transistor 28 and base 32 of transistor 36 go negative, as in waveform A, causing conduction through transistor 36. Voltage at base 32 is slightly negative relative to a lagging voltage at emitter 44, waveform B, making diode 40 cut off. Forward current through transistor 36 continues momentarily while stray capacity 56 in the collector circuit of lower stage 28 charges through load resistor 52 toward the $Ecc_2$ supply and furnishes drive to base 32. This results in an emitter follower action wherein output at emitter 44 then follows input at base 32, producing a rapid negative charging of capacitor 60 and stray capacities 58 and 64 through the small resistance path of forward conducting transistor 36 toward the $Ecc_1$ supply, which path effectively bypasses resistor 52. The charge path for capacitor 60 is completed through base 66 of conducting transistor 30, and ground. For best operation the size of the instant load resistor is limited by the charging time requirements of the collector circuit stray capacities and should not be made excessively large.

A regenerative action builds up rapidly, causing base 66 to go more negative and transistor 30 to conduct further, as in waveforms C and D, while the latter stage approaches saturation. Emitter 46 of transistor 38 and capacitor 72 reach their maximum positive swing, shown by waveforms E and F, and further insure cutoff of transistor 28. When the charge on capacitors 56, 58, 60 and 64 builds up sufficiently, forward current through emitter 44 ceases, and transistor 36 saturates. Diode 40, which remains cut off, then prevents further conduction through emitter 44. Thereafter, due to the voltage difference between $Ecc_1$ and $Ecc_2$, collector current reverses and flows toward base 32. Collector 48 and base 32 are then clamped together at approximately equal voltages and current is forced to flow through load resistor 52 which thereafter reduces conduction during the following semistable period. Thus, current in each portion of the circuit is now limited by the respective load resistor, for the remaining level interval until the next transition occurs.

At time $t_3$, the actions of each half of the circuit are reversed. Capacitor 72 which had been charged prior to time $t_1$ begins to discharge during the period between $t_2$ and $t_3$, waveform F, through transistor 30, diode 42, and resistor 78 toward the $Ecc_2$ line. Stray capacity 68 similarly discharges through resistor 78. When voltage at base 74 of transistor 28 reaches a negative value at $t_3$, waveform F, transistor 28 again conducts and a positive pulse appears at collector 24, shown by waveform A. Transistor 36 then comes out of saturation and cuts off when diode 40 conducts, while voltage at emitter 44, waveform B, approaches the zero level. Capacitor 60 transfers the positive going pulse to base 66, waveform C, cutting off transistor 30. At this point transistor 38 starts to conduct and diode 42 is cut off. Stray capacity 76 charges through load resistor 54 and drives base 34. Capacitor 72 and stray capacities 70 and 68 are then charged toward the value of $Ecc_1$ through transistor 38 by an emitter follower action like that of the previous half cycle, which effectively bypasses load resistor 54. The charge path for capacitor 72 also includes base 74 and the grounded emitter connection of transistor 28. When the charges on these capacitors build up sufficiently, current through emitter 46 again ceases and diode 42 prevents further forward conduction. Transistor 38 then saturates and current reverses, with conduction occurring from collector 50 toward base 34 and the $Ecc_2$ line, through resistor 54, which again limits the flow.

At the end of a complete sequence of events, as herein described, the circuit returns to its original state to begin a new cycle which thereafter continuously repeats. Thus, it may be seen that the present circuit permits efficient operation with only small current requirements during normal semistable intervals, while supplying larger currents to achieve faster response during transition periods. In addition, it provides a lower output impedance by utilizing the inherent low impedance characteristic of the common collector configuration, wherein output is taken from the emitter electrodes of the added stages, and by shunting the load resistors during appropriate periods.

Figure 4:
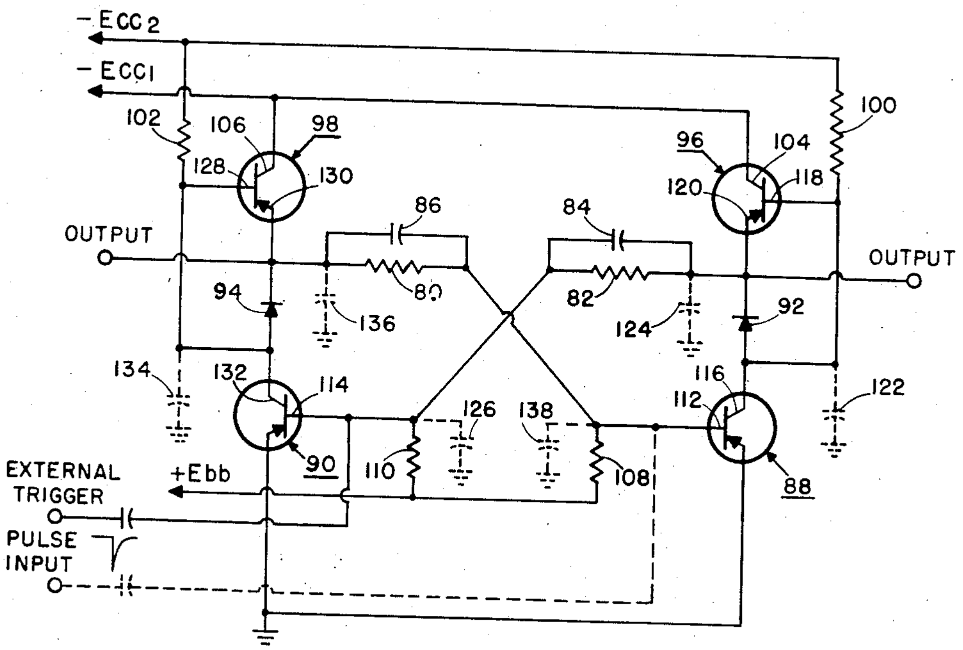
Fig. 4 is a bistable pulse circuit employing the present invention.

Fig. 4 illustrates a variation of the instant invention as incorporated in a bistable multivibrator configuration. The essential difference between the present circuit and the astable version of Fig. 2 is that in this instance there are no coupling capacitors feeding back output from one stage to the input of the other stage to produce a continuous regenerative cycle. The recycling action of the astable circuit was induced by the charge and discharge of the coupling capacitors, which changed the conduction state of each stage from one condition to another by control of the base input voltages. The instant configuration utilizes resistors 80 and 82 to perform the coupling function. Parallel capacitors 84 and 86 merely speed the application of the vertical or high frequency portions of the pulses to the following stage, and are relatively small in value compared to those of Fig. 2.

The instant circuit has two stable states and requires an external trigger pulse to change from one to another. When one signal switching stage is conducting or "on," the other is "off" and this condition is maintained until reversed by the externally applied voltage. The general arrangement is similar to that of Fig. 2 wherein the collector load of lower transistors 88 and 90 includes diodes 92 and 94 and added load switching transistors 96 and 98 respectively, in a substantially shunt path with load resistors 100 and 102 of each stage. The load resistors are again tied to a more negative supply voltage $Ecc_2$, while collectors 104 and 106 of the added transistors are connected to a less negative supply voltage $Ecc_1$. Coupling resistors 80 and 82, together with resistors 108 and 110 respectively, form voltage dividers from a separate positive voltage source $Ebb$ to furnish bias to bases 112 and 114 of transistors 88 and 90.

In the first instance of time transistor 88 is assumed to be conducting in a saturated state. The voltage at base 112 is therefore held at close to ground potential or slightly negative, and a small emitter to base current flows toward resistor 80 and transistor 98. Most of the current, however, flows through collector 116 which is a little more negative than the base. The same potential also appears at base 118 of transistor 96, to which collector 116 connects. Due to voltage divider resistors 110 and 82 from the $Ebb$ supply, a slight positive voltage appears at output emitter 120, and small quiescent or stand-by collector current therefore flows through transistor 96. Diode 92 is cut off by the polarity between negative base 118 and positive emitter 120. Thus, the main current flow through transistor 88, as in the preceding circuit, flows through limiting load resistor 100 to the more negative $Ecc_2$ supply. At the same time it is assumed that the various capacities in this section of the circuit are in a discharged state, with stray capacity 122 having previously discharged through transistor 88, upon the initial conduction of that state. Stray capacities 124 and 126 and capacitor 84 have also been discharged through a path, including resistor 82, diode 92, transistor 88 and ground.

A complementary condition exists in the second half of the circuit. Transistor 90 is presently held cut off by a positive voltage at base 114 established by voltage divider 110 and 82. Upper transistor 98 is in a saturated condition with reverse current flowing from collector 106 to base 128, while due to the bias network of resistors 108 and 80, some additional current flows in the normal direction from emitter 130 to base 128. Saturation causes the voltage at output emitter 130 to be approximately equal to that of the $Ecc_1$ supply at collector 106 and the sum of this voltage and that from the $Ebb$ supply appears across resistors 108 and 80. Since the connection to base 112 of conducting transistor 88 is close to ground potential, the $Ecc_1$ voltage is developed largely across resistor 80, while the $Ebb$ potential is across resistor 108. Voltage at base 128 is clamped to and slightly negative with respect to both emitter 130 and collector 106. Collector 132 of transistor 90 is therefore also slightly negative with respect to emitter 130 and diode 94 is cut off. Current in this portion of the circuit thus flows from transistor 98 toward the $Ecc_2$ supply through load resistor 102, which again limits current during the semistable period. Concurrently, the various related capacities are assumed to be in a charged state, with stray capacities 136 and 138 and capacitor 86 having been charged through load shunting transistor 98 during the immediately preceding transition period, while stray capacity 134 has been charged through resistor 102.

When an external negative trigger pulse is applied at input base 114 of transistor 90, current begins to flow in this stage and stray capacity 134 discharges rapidly through the low conduction resistance. Collector 132, along with base 128, becomes less negative and transistor 98 comes out of saturation and cuts off. Due to the negative charge on stray capacities 136 and 138 and capacitor 86, potential at emitter 130 lags that at base 128, thus providing a polarity which permits diode 94 to conduct. The charged capacities then discharge toward ground through the path, including resistor 80, diode 94 and transistor 90. Thereafter, transistor 90 conducts more heavily and saturates with most of its current flowing through and limited by load resistor 102, while an additional small base current flows toward transistor 96. At the end of the instant transition period, diode 94 again cuts off as output emitter 130 becomes more positive, and a nominal quiescent current starts to flow through voltage divider resistors 108 and 80 and transistor 98. Although the same negative trigger is applied through resistor 82 and capacitor 84 to emitter 120 of transistor 96, there is little direct effect on that stage, as the pulse permits diode 92 to conduct only momentarily while also cutting off the emitter electrode. At the same time the input trigger is inverted at collector 132 and base 128, to appear as a positive going pulse at emitter 130 of transistor 98. It is then coupled through resistor 80, with capacitor 86 speeding up the sharper edges, to base 112 of transistor 88 and causes this stage to come out of saturation. As shown, the negative input trigger may also be applied directly to base 112, but will have no effect while the instant stage is in a saturated conduction state. Later, however, in the alternate portion of the cycle, the negative pulse can be effective to turn transistor 88 "on."

The circuit then continues to operate in a manner very similar to that of Fig. 2. The trigger causes the negative potential at collector 116 to increase sharply together with that at base 118 of transistor 96, again cutting off diode 92 and reestablishing conduction of emitter 120. Capacitor 122 then starts to charge through load resistor 100 toward the $Ecc_2$ supply and furnishes drive to base 118 and emitter 120. The emitter follows the base, permitting an increased current to rapidly charge stray capacities 124 and 126 and capacitor 84 through the low resistance path of forward conducting transistor 96, toward the $Ecc_1$ supply. Thus, load resistor 100 is bypassed during this transition period. When the charge builds up sufficiently, emitter current is reduced to a steady state value, and a slightly negative potential at base 118 and collector 116 with respect to that at output emitter 120 causes diode 92 to remain cut off. The positive going pulse at base 112 then halts further conduction through lower transistor 88 while upper transistor 96 saturates. Collector current in the latter stage then reverses and flows toward the larger $Ecc_2$ supply from collector 104 through base 118 and load resistor 100, with the large resistance thereafter limiting current during the next stable period. A small emitter current also continues to flow from emitter 120 to base 118, due to bias resistor 82 and 110. In addition, the positive voltage at base 112 furnished by voltage divider resistors 108 and 80 holds transistor 88 cut off for the remainder of the interval. The same voltages which had appeared on one side of the circuit now appear on the other and remain there until the next trigger pulse occurs, whereupon the circuit again reverts to its original state. The external trigger pulses may be applied in any suitable manner to provide the proper sequence of operation.

Figure 5:
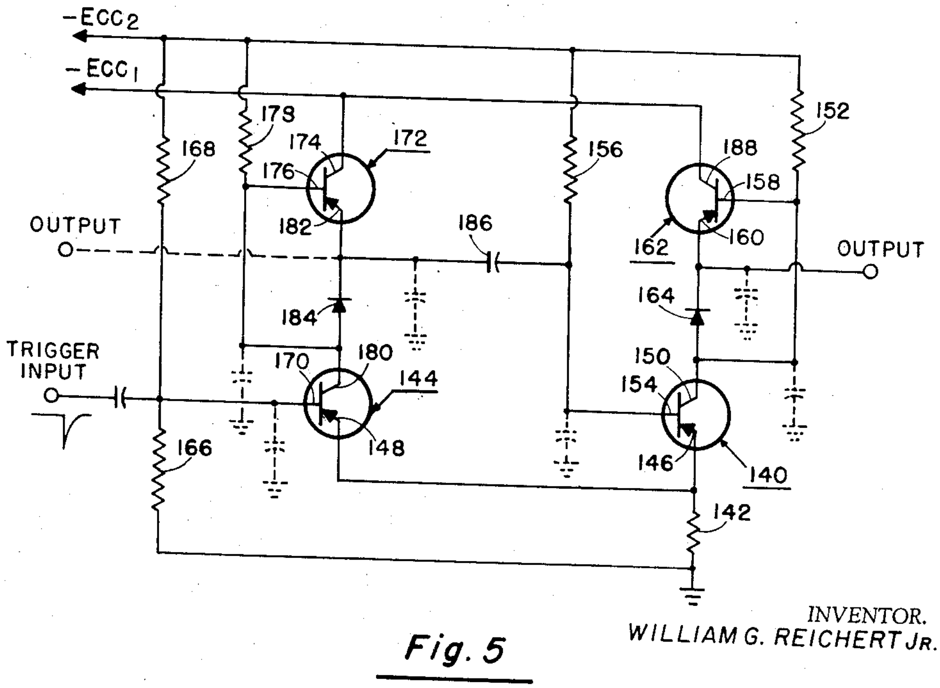
Fig. 5 shows a monostable configuration incorporating the improved circuitry.

Fig. 5 is a modification of a monostable multivibrator circuit employing the present invention. The monostable configuration or one-shot multivibrator has only one stable state. It is energized by an external trigger signal and performs one complete regenerative cycle. It then returns to its original stable or quiescent condition and remains there until a second trigger pulse occurs. One coupling capacitor is utilized from the output electrode of a first stage to the input of a second stage and an emitter coupling arrangement completes the feedback path to produce the single regenerative cycle and output pulse. The circuit, like that of Fig. 2, incorporates an additional pair of load switching transistors and diodes, larger load resistors, and a second smaller direct voltage source, into the normal configuration. A newly added voltage divider network is placed between the larger direct voltage supply and ground to furnish bias to the base of the trigger input stage, while an additional resistor, common to the emitters of the lower stages, provides the feedback arrangement.

During the normal quiescent period, signal switching transistor 140 is assumed to be conducting and saturated. The main flow of current occurs through common emitter resistor 142, thus placing the same voltage at both emitter electrodes 146 and 148 respectively. The emitter resistor also has the effect of increasing the saturation level of the lower stages, since the common electrodes are not connected directly to ground or the zero voltage reference. Most of the current then flows through transistor 140, toward collector 150 and limiting load resistor 152, to the larger $Ecc_2$ direct voltage supply. An additional small base current flows from base 154 through bias resistor 156 to the $Ecc_2$ line. The connection between collector 150 and upper base 158 places both electrodes at the same potential, and in turn approximately the same voltage appears at output emitter 160 of upper transistor 162. Thus, the latter stage and diode 164 are cut off, and current in this section is limited by the load resistor in conjunction with the emitter resistor.

Trigger input transistor 144 is held cut off by the action of voltage divider resistors 166 and 168 which place a quiescent potential at base 170 that is slightly positive with respect to that at emitter 148. The direct base bias value and the charge on associated stray base input capacities remain substantially constant throughout the operation of the circuit. Upper transistor 172, at this time, is in a saturated state with reverse current flowing from the $Ecc_1$ supply through collector 174, base 176 and limiting resistor 178, to the more negative $Ecc_2$ supply. In this condition, voltage at base 176 is slightly negative with respect to the $Ecc_1$ value at collector 174, while that at emitter 182 is approximately equal to that at the base. Collector 180 of the lower stage is connected to the upper base, causing the same potential to appear at both electrodes. Thus, current is prevented from flowing through diode 184 and emitter 182 which are presently cut off, and current in this portion of the circuit is effectively limited by resistor 178.

For proper operation, the voltage levels at various points of the circuit must be carefully chosen. For example, bias voltage at base 154 of normally conducting transistor 140 is established at a somewhat more negative value than the corresponding level of transistor 144, so that triggering can be accomplished by a negative pulse equivalent to that difference. The larger base voltage then appears across emitter resistor 142, when transistor 140 is conducting and saturated, causing a larger current to flow through this stage and the load resistor. In addition, the values of load resistors 152 and 178, together with common emitter resistor 142, are selected to maintain a ratio which aids in establishing the proper potential relationship between the two complementary sections. The previously mentioned voltage divider resistors 166 and 168 and bias resistor 156 also affect this relationship.

Upon the occurrence of a negative input trigger pulse at base 170, the base voltage is momentarily made slightly negative with respect to emitter 148 and current begins to flow through transistor 144. Conduction of this stage discharges stray capacities in the collector circuit through the low transistor resistance. A positive going pulse appears at collector 180 of the lower stage and at base 176 of upper transistor 172. Due to the effect of charged stray capacities at emitter 182, voltage at the latter electrode lags that at the base, thus permitting diode 184 to conduct while transistor 172 is cut off. The emitter capacities then discharge toward ground through the diode, transistor 144, and resistor 142. Current through diode 184 continues to hold transistor 172 cut off, following this period, as coupling capacitor 186 commences to discharge through the same path toward resistor 156 and the $Ecc_2$ supply. In addition, stray capacities in the base circuit of transistor 140 charge through this resistor toward the $Ecc_2$ line.

The positive transition pulse is also transferred through capacitor 186 to base 154 of transistor 140 and cuts off conduction of that stage. The same voltage likewise appears at lower emitter 146 due to an emitter follower action, which in turn feeds the pulse back to emitter 148, driving this electrode in a positive direction to cause further conduction of transistor 144. A cumulative or regenerative action results which causes the latter stage to saturate and makes the voltages at the several electrodes approximately equal, at a reference level close to that of the bias at base 170. Thus, current in the instant portion of the circuit is now largely directed through emitter resistor 142 and resistor 178 which thereafter limit the flow.

The positive pulse at base 154 is inverted and appears as a negative pulse at collector 150 of transistor 144 and at base 158 of transistor 162. The negative pulse causes the associated collector to ground stray capacity of the lower stage to charge through load resistor 152 and drive base 158 of the upper stage. Emitter 160 follows the base to charge stray capacities in the emitter output circuit through transistor 162, effectively bypassing load resistor 152. As the base becomes slightly negative with respect to the collector, current in the stage saturates and reverses, to flow from the smaller $Ecc_1$ supply toward $Ecc_2$ through collector 188, base 158 and load resistor 152. The latter resistor thereafter limits the flow of current. Voltage at emitter 160 continues to follow and remain substantially equal to that at base 158 and in turn also equals that at collector 150 of transistor 140. Therefore, diode 164 continues to be cut off and further conduction of emitter 160 is prevented.

Meanwhile, capacitor 186 and stray capacities in the circuit of base 154 have continued to become more negative while respectively discharging and charging through resistor 156, toward $Ecc_2$. When the voltage at base 154 reaches a negative value compared to that at emitter 146, transistor 140 again starts to conduct and discharges the collector stray capacities. The negative going base voltage is followed by emitter 146, correspondingly making emitter 148 more negative. When emitter 148 is negative with respect to base 170, transistor 144 again cuts off and its collector stray capacities charge through resistor 178. Collector 180 becomes more negative as does base 176 of transistor 172, causing transistor 172 to start forward conduction. A regenerative action takes place as the negative going potential is transferred through capacitor 186 to base 154 of transistor 140, causing further conduction of the latter stage, which then feeds back an increasing negative voltage to emitter 148 of stage 144. As transistor 172 starts to conduct, base 176 becomes slightly negative relative to emitter 182 and diode 184 cuts off. Forward current continues momentarily while the charging collector stray capacity of the lower stage drives the upper base. Emitter 182 follows, producing a rapid charging of coupling capacitor 186 and the tray capacity in the emitter circuit of transistor 172, while discharging the stray base circuit capacity of transistor 140. An increased current flows through the small resistance of conducting transistor 172 toward the $Ecc_1$ supply, and bypasses resistor 178. When the capacity charges build up sufficiently, emitter current ceases and transistor 172 saturates. Base and emitter voltage become approximately equal at a value slightly more negative than that at the collector. Current through collector 176 then reverses, and flows from the smaller $Ecc_1$ supply toward base 176 and resistor 178 to the larger $Ecc_2$ supply, while emitter 182 is cut off. Thus, current is thereafter again limited by resistor 178. As shown in the figure, an additional complementary output voltage pulse may be taken from the connection at emitter electrode 182.

At the same time, base 154 has become more negative, and current through transistor 140 increases until saturation occurs. Collector 150 and base 158 become more positive while the potential at emitter 160 lags. Transistor 162 then cuts off and current flow in this section is again restricted to that through resistors 142 and 152. The circuit has now returned to its initial state and awaits the occurrence of the next trigger pulse.

Other forms of the instant invention can be employed with some attendant circuit modifications. For example, a non-saturating type of action can be utilized which incorporates diode or bias networks to limit operation to within a predetermined range of output amplitudes and prevent the circuit from reaching the saturation level. The non-saturated configuration permits the attainment of higher switching speeds and repetition rates by preventing current reversals and minimizing storage effects which are characteristic of the saturated circuit. However, some additional current drain and loss of efficiency may result, along with an inherently higher output impedance.

In addition, any of the previously described variations may have the reference ground relocated without changing circuit operation. Thus, the $Ecc_1$ line of Fig. 2 may be utilized as the ground, in cooperation with a less negative $Ecc_2$ supply and a positive voltage in place of the instant ground connection.

It is therefore apparent that the present invention permits a reduction in current requirements while providing more efficient, reliable and rapid operation of trigger circuits than heretofore obtainable.

While several embodiments have been illustrated, it is to be understood that the invention is not limited to the exact form or use indicated and that variations may be made in the particular design and configuration without departing from the scope of the invention, as set forth in the appended claims.

What is claimed is:

1. A switching circuit comprising a first signal switching means having a first output load; a second signal switching means having a second output load; means for coupling said first and second signal switching means to generate a pulsed output waveform having alternate maximum and minimum semistable conduction periods and respective transition intervals therebetween; a first load switching means substantially bypassing said first output load to provide increased current and rapid response during one of said transition intervals and permitting said first output load to limit the flow of said current during said semistable periods; and a second load switching means for bypassing said second output load during the other of said respective transition intervals and permitting said second output load to limit current during said semistable periods.

2. A pulse switching circuit comprising a first signal switching means having an input, an output and a common electrode; a first load connected to said output electrode; a second signal switching means having an input, an output and a common electrode; a second load connected to said second output electrode; means for coupling said output electrode of said first signal switching means to said input electrode of said second signal switching means and for coupling said second signal switching means to said first signal switching means, to generate a pulsed output waveform having alternate maximum and minimum semistable conduction periods and respective transition intervals therebetween; a first load switching means having an input, an output and a common electrode, connected substantially parallel to and bypassing said first load to provide increased current for rapidly charging circuit capacities during one said transition interval, and including means to permit said first load to limit the flow of said current during said semistable output periods; a second load switching means having an input, an output and a common electrode, connected to bypass said second load to provide said increased charging current during the other of said respective transition intervals, and means to permit said second load to limit the flow of said current during said semistable output periods.

3. A pulse switching circuit comprising a first signal switching means having an input, an output and a common electrode; a first load connected to said output electrode; a second signal switching means having an input, an output and a common electrode; a second load connected to said second output electrode; means for coupling said output electrode of said first signal switching means to said input electrode of said second switching means and for coupling said second signal switching means to said first signal switching means, to generate a pulsed output waveform having alternate maximum and minimum semistable conduction periods and respective transition intervals therebetween; a first direct current supply means connected to each said first and second loads; a first load switching means, having an input, an output and a common electrode, connected substantially parallel to said first load to bypass said first load and provide increased current during one said transition interval and to permit said first load to limit the flow of said current during said output semistable periods; a second load switching means having an input, an output and a common electrode, connected to bypass said second load and provide increased current during the other of said respective transition intervals and to permit said second load to limit said current during said output semistable periods; said first and second load switching means including a second smaller potential direct current supply means connected to each said load switching means, to provide said increased current therethrough for rapidly charging circuit capacities during said transition intervals and to cause a limited reverse current flow during said alternate output semistable minimum conduction periods, whereby said reverse current flows between said first and second direct current supply means through each said load alternately, to limit said reverse current.

4. A pulse switching circuit comprising a first signal switching transistor having a base input, a collector output and a common emitter electrode; a first load connected to said collector output electrode; a second signal switching transistor having a base input, a collector output and a common emitter electrode; a second load connected to said second collector output electrode; means for coupling said collector electrode of said first signal switching transistor to said base electrode of said second signal switching transistor and for coupling said second signal switching transistor to said first signal switching transistor, to generate a pulsed output waveform having alternate maximum and minimum semistable conduction periods and respective transition intervals therebetween; a first direct current supply means connected to each said first and second loads; a first load switching transistor having a base input, an emitter output and a common collector electrode, connected substantially parallel to said first load to bypass said first load and provide increased current during one said transition interval and to permit said first load to limit the flow of said current during said output semistable periods; a second load switching transistor having a base input, an emitter output and a common collector electrode, connected to bypass said second load and provide increased current during the other of said respective transition intervals and to permit said second load to limit said current during said output semistable periods, said first and second load switching transistor including a second smaller potential direct current supply means connected to each said common collector electrode of each said load switching transistor to provide said increased current therethrough for rapidly charging circuit capacities during said transition intervals and to cause a limited reverse current flow during said alternate output semistable minimum conduction periods, whereby said reverse current flows between said first and second direct current supply means through each said load alternately, to limit said reverse current; and bias means for causing each said load switching transistor to operate in a saturated state during said alternate output semistable minimum conduction periods and each said signal switching transistor to operate in said saturated state during said alternate output semistable maximum conduction periods.

5. The device of claim 1 wherein said means for coupling said first and second signal switching means includes regenerative coupling means to generate a continuous free-running series of output pulses of said waveform.

6. The device of claim 1 wherein said coupling means includes means to cause each said signal switching means to alternate from one conduction state to another upon application of an external trigger pulse and to remain in said other state until the occurrence of a second trigger pulse.

7. The device of claim 1 wherein said coupling means includes regenerative coupling means to cause each said signal switching means to alternate from an initial conduction state to another upon application of an external trigger pulse and then to return to said initial state and to remain in said initial state until the occurrence of a second trigger pulse.

8. The device of claim 2 wherein each said means to permit said first and second loads to limit the flow of said current during said semistable output periods includes bias means, connected in series with each said load switching means, to prevent each said load switching means from bypassing said load during said semistable output periods.

9. The device of claim 8 wherein said bias means comprises a diode connected in series with each said output electrode of each said load switching means.

10. The device of claim 6 including bias and direct current supply means to provide potential levels for said external trigger pulse to overcome to initiate action of said signal switching means.

11. The device of claim 7 including bias and voltage divider means to provide potential levels for said external trigger pulse to overcome to initiate action of said signal switching means.

No references cited.

Notice of Adverse Decision in Interference

In Interference No. 91,458 involving Patent No. 2,874,315, W. G. Reichert, Jr., Switching device, final judgment adverse to the patentee was rendered July 31, 1962, as to claims 1, 2, 6 and 10.

[*Official Gazette January 29, 1963.*]